(12) United States Patent
Stromberg et al.

(10) Patent No.: US 8,073,439 B2
(45) Date of Patent: Dec. 6, 2011

(54) CONTROL SYSTEM AND METHOD FOR OPERATING A TRANSCEIVER

(75) Inventors: Guido Stromberg, Munich (DE); Thomas Sturm, Kirchheim (DE)

(73) Assignee: Infineon Technologies AG (DE)

( * ) Notice: Subject to any disclaimer, the term of this patent is extended or adjusted under 35 U.S.C. 154(b) by 38 days.

(21) Appl. No.: 10/920,150

(22) Filed: Aug. 17, 2004

(65) Prior Publication Data

US 2005/0085193 A1    Apr. 21, 2005

Related U.S. Application Data

(63) Continuation of application No. PCT/DE03/00407, filed on Feb. 12, 2003.

(30) Foreign Application Priority Data

Feb. 18, 2002    (DE) .................................. 102 06 745

(51) Int. Cl.
*H04M 3/00*    (2006.01)
(52) U.S. Cl. .......... 455/420; 455/41.1; 455/41.2; 700/9; 700/83
(58) Field of Classification Search .................... 455/73, 455/420
See application file for complete search history.

(56) References Cited

U.S. PATENT DOCUMENTS

| | | | |
|---|---|---|---|
| 5,306,995 A | 4/1994 | Payne et al. | |
| 5,831,555 A * | 11/1998 | Yu et al. | 341/26 |
| 5,938,757 A | 8/1999 | Bertsch | |
| 6,088,717 A * | 7/2000 | Reed et al. | 709/201 |
| 6,121,593 A | 9/2000 | Mansbery et al. | |
| 6,133,847 A * | 10/2000 | Yang | 340/825.22 |
| 6,374,079 B1 * | 4/2002 | Hsu | 455/11.1 |
| 6,546,297 B1 | 4/2003 | Gaston et al. | |
| 6,781,518 B1 * | 8/2004 | Hayes et al. | 340/825.72 |
| 6,922,258 B2 * | 7/2005 | Pineau | 358/1.15 |
| 7,072,945 B1 * | 7/2006 | Nieminen et al. | 709/217 |
| 2001/0025376 A1 * | 9/2001 | Knobl | 725/74 |
| 2001/0029178 A1 * | 10/2001 | Criss et al. | 455/419 |
| 2001/6039460 | 11/2001 | Aisa | |
| 2002/0049695 A1 * | 4/2002 | Gallery et al. | 707/1 |
| 2002/0087891 A1 | 7/2002 | Little et al. | |
| 2002/0115433 A1 | 8/2002 | Baker | |
| 2003/0073461 A1 | 4/2003 | Sinclair | |
| 2004/0166895 A1 * | 8/2004 | Koenck et al. | 455/556.1 |
| 2005/0032556 A1 * | 2/2005 | Bennett et al. | 455/574 |
| 2005/0164670 A1 * | 7/2005 | Sorrells et al. | 455/323 |

FOREIGN PATENT DOCUMENTS

| | | |
|---|---|---|
| DE | 695 20 661 T2 | 8/1996 |
| DE | 100 42 753 A1 | 12/2001 |
| EP | 0 620 631 A1 | 10/1994 |
| EP | 0 727 123 B1 | 8/1996 |
| EP | 0 846 991 A1 | 6/1998 |
| EP | 1 016 831 A1 | 7/2000 |

(Continued)

*Primary Examiner* — Charles Appiah
*Assistant Examiner* — Mazda Sabouri
(74) *Attorney, Agent, or Firm* — Dickstein Shapiro LLP (57) ABSTRACT

Transceiver for controlling an application device by means of an external control device. The transceiver has a control unit, a memory unit coupled to the control unit, a control interface coupled to the control unit, a communication interface coupled to the control unit, wherein the application device is controllable using the external control device via the control interface and via the communication interface using the control unit, and an application control program stored in the memory unit, wherein the application control program is communicated to the external control device via the communication interface.

4 Claims, 3 Drawing Sheets

FOREIGN PATENT DOCUMENTS

| | | |
|---|---|---|
| EP | 1 091 531 A1 | 4/2001 |
| WO | WO-01/41398 A1 | 6/2001 |
| WO | WO-01/50261 A2 | 7/2001 |
| WO | WO-01/63389 A1 | 8/2001 |
| WO | WO-01/86833 A1 | 11/2001 |
| WO | WO-02/13039 A1 | 2/2002 |

* cited by examiner

CONTROL SYSTEM AND METHOD FOR OPERATING A TRANSCEIVER

CROSS-REFERENCE TO RELATED APPLICATION

This application is a continuation of International Patent Application Serial No. PCT/DE03/00407, filed Feb. 12, 2003, which published in German on Aug. 28, 2003 as WO 03/071366.

FIELD OF THE INVENTION

The invention relates to a transceiver, a controllable application arrangement, a control system and a method for operating a transceiver.

BACKGROUND OF THE INVENTION

The number of apparatuses of all kinds, for example domestic appliances, with an integrated microprocessor is rising rapidly and far exceeds the number of workstations, personal computers and high-performance computers.

Therefore, it is desirable for every day apparatuses such as sensors (for example the water level sensor of hydroponics), control electronics (for example for a heating system), domestic appliances (for example washing machines) or automotive electronics (for example for controlling electric window winding mechanisms) to be coupled in a wirefree manner to an external control device such as a laptop or a mobile radio telephone in order to enable a central control. For this purpose, two types of devices are often interlinked with one another. One type of device is the external control device, that is to say a computer system with sufficiently high computing power and sufficiently large memory space in order to be able to control other devices (such an external control device may be for example a personal computer, a laptop, a personal digital assistant or a sufficiently powerful mobile radio telephone). Devices of this type may also be referred to as "mobile terminal". The other type of device is a transceiver ("smart transceiver") with limited computing power and memory space, which can be integrated in a terminal (for example in a temperature sensor, a washing machine or an automobile).

Very different requirements made of transmission speed, security and driving have to be fulfilled depending on the respective application to be controlled. In other words, in accordance with the prior art, it is necessary to specifically coordinate the control device and the transceiver with one another, in particular to install an application control software on the control device and to ensure the capability for communication between control device and transceiver. In this respect, a problem that frequently occurs consists in the compatibility between the external control device, on the one hand, and the transceiver, on the other hand.

For the physical layer, in accordance with a communication layer model in accordance with which the wirefree communication between the external control device and the transceiver is effected, standards have been defined and are in use, such as, for example, Bluetooth, IEEE802.11x, RKE, etc.

At the level of an application to be controlled, i.e. in accordance with the application layer, it is generally presupposed that both apparatuses, that is to say the external control device and the transceiver, are provided with a specific communication and control software—coordinated with one another—for the respective partner. This presupposes that the external control device, on the one hand, and the transceiver, on the other hand, are coordinated with one another in detail prior to start-up. This requires a high outlay and results in a low flexibility. In order to be able to control an application associated with the transceiver using the external control device, it is often necessary in accordance with the prior art, prior to the first start-up, to store the associated application control program in a memory device of the external control device in order, in the case where the application is executed as required, to be able to process the application control program within the external control device and to be able to communicate corresponding control signals to the transceiver unit for controlling the application. Therefore, a high memory requirement is needed by the external control device, and, in the case where a multiplicity of different applications are controlled as required, the external control device may encounter its capacity limits.

Furthermore, prior to the first instance of controlling an application associated with a transceiver, the transceiver and the external control device have to be coordinated with one another in order to create the preconditions for a later control of an application. This is complex and difficult and often has to be carried out by a person skilled in the art.

DE 100 42 753 A1 describes a PC-based vacuum cleaner robot that receives control instructions via a radio link from a PC program stored in a PC.

DE 695 20 661 T2 describes a television receiver and also a remote control device by means of which the television receiver is remotely controlled. The remote control device transmits to the television receiver an identity code assigned to the remote control device and keys or algorithms for use as security codes in subsequent procedures.

SUMMARY OF THE INVENTION

The invention is based on a problem of enabling the control of an application device using a transceiver and an external control device with reduced complexity and therefore more cost-effectively and more flexibly.

The problem is solved by means of a transceiver, by means of a controllable application arrangement, by means of a control system and by means of a method for operating a transceiver with the features in accordance with the independent patent claims.

The transceiver according to an embodiment of the invention has a control unit, a memory unit coupled to the control unit, a control interface coupled to the control unit, and a communication interface coupled to the control unit. An application control program is stored in the memory unit. An application device is controllable by means of an external control device via the control interface and via the communication interface using the control unit. Furthermore, it is possible for the application control program to be communicated to the external control device via the communication interface.

In accordance with another embodiment of the invention, the transceiver has a control unit, a memory unit coupled to the control unit, a control interface coupled to the control unit, and a communication interface coupled to the control unit. An identification specification that unambiguously identifies an application control program is stored in the memory unit. An application device is controllable by means of an external control device via the control interface and via the communication interface using the control unit. It is possible for the identification specification to be communicated to the external control device via the communication interface.

The controllable application arrangement according to another embodiment of the invention has an application device, and also a transceiver coupled to the application device, with the features mentioned above. To put it another way, the transceiver is fitted to or in the controllable application arrangement.

Furthermore, an embodiment of the invention provides a control system for an application device, having a transceiver with the features mentioned above and also having an external control device. The external control device is set up in such a way that it can communicate with the transceiver.

Furthermore, another embodiment of the invention provides a method for operating a transceiver having the features mentioned above. In accordance with the method, the application control program is communicated to the external control device (as required) via the communication interface. Furthermore, an application device is controlled by means of an external control device via the control interface and via the communication interface using the control unit.

A basic idea of the invention consists in meeting the requirements of controlling a wide variety of applications by means of a central external control device by virtue of the fact that the transceiver itself carries the application control program for controlling an application device coupled to the transceiver. By way of example, if a washing machine is intended to be controlled from a laptop, then the transceiver incorporated into the washing machine contains the control software for controlling the washing machine. If the washing machine is intended to be controlled from the laptop, then the control software is communicated from the transceiver to the laptop, so that a powerful processor of the laptop can process the control software and can thus control the washing machine. The application control program can thus be communicated to an external control device via the communication interface. On this external control device that has a sufficiently powerful microprocessor, the application control program can be processed and the application assigned to the transceiver can therefore be controlled. As a result, a complex initial configuration of the external control device with regard to a transceiver for the control of a specific application prior to the first use is dispensable, thereby saving costs, time and memory space. Clearly, an embodiment of the invention provides a distributed system in which a transceiver can communicate with an external control device that may be unknown to it beforehand. In this case, no assumptions about the physical layer are made, although the existence of a protocol conversion unit having an IP capability is presupposed.

In order to be able to communicate with one another, a communication link may be established between the transceiver and the external control device using a protocol suitable for this (for example CORBA, Common Object Request Broker Architecture).

Furthermore, it is possible to check (for example by communicating an identification code) whether the application control program is already contained on a memory device of the external control device. If this is not the case, then the application control program stored on the memory unit of the transceiver is communicated, that is to say downloaded, to a memory device of the external control device via the communication interface. This preferably involves code for a Middleware platform such as the Java Virtual Machine (JVM) or .NET, in order to be able to carry out a transitionless and platform-independent integration into the system of the external control device (in a controllable fashion using a Web browser).

The further communication between the application control program communicated to the memory device of the external control device and the control unit of the transceiver may then be effected completely in application-specific fashion, i.e. it is not necessary to establish a standard. The application software is executed by a powerful processor of the external control device, and the application associated with the transceiver is controlled by the processor by means of the control unit of the transceiver.

In other words, the transceiver itself carries the application control program required by the external control device in order to control the transceiver (or the associated application). The transceiver carries the software code for the application to be executed, but is not the executing entity. Therefore, the control unit of the transceiver may be embodied for example as a simple 8-bit microprocessor and need not be an expensive high-performance processor. The application program is executed by the external control device, which can communicate with the transceiver in such a way that the requisite program code can be communicated to the external control device.

Preferred embodiments of the invention emerge from the dependent claims.

Consequently, the transceiver clearly represents preferably an embedded device which is provided at or in the application device and is coupled thereto.

Preferably, the communication interface of the transceiver is set up in such a way that the communication with an external control device is effected via radio link.

In other words, a wirefree communication between transceiver and external control device is made possible according to an embodiment of the invention, thereby increasing user convenience. The communication may be effected for example by means of infrared radiation, radio wave radiation or electromagnetic radiation having some other suitable wavelength. As an alternative, the communication may also be effected by means of an electrical coupling means (for example a current lead).

The memory unit of the transceiver may be writable or may be nonwritable. Preferably, the memory unit is writable via the communication interface. As an alternative, the memory unit may be a memory having a first and a second submemory, the first submemory being writable and the second being nonwritable.

In particular, the memory unit or the first submemory may be a read/write memory, i.e. a RAM memory (Random Access Memory), or a nonvolatile read/write memory (e.g. EPROM, EEPROM or FLASH).

The nonwritable memory unit or the second submemory may be a read only memory, i.e. a ROM memory.

It is desirable for the memory for storing the application control program (control application) to be realized in a fashion as small and cost-efficient as possible. Therefore, the memory unit of the transceiver preferably has a storage capacity of less than 1 megabyte.

The memory unit may have a first and a second submemory, an application control program specific to the control of a very specific application being stored in the first submemory, and some other data being stored in the second submemory. The some other data may be for example information with regard to a menu structure and/or information with regard to a user interface.

The memory unit may have a first or a second submemory, specific data of a member of an application family being stored in the first submemory, and data common to an application family being stored in the second submemory.

With regard to the external control device ("mobile terminal"), an application control program is downloaded onto a Middleware platform, where the application control program can be executed on the external control device. In the transceiver, said application may optionally be present as a contiguous block in a homogeneous memory unit, but it may alternatively be divided into (at least) two individual blocks. Despite an often high number and diversity of applications that are intended to be controlled by a central external control device, a plurality of application families can often be distinguished depending on the application devices in which a transceiver of the invention may be embedded. An application family includes for example transceivers with a common input/output configuration, for example A/D converters or D/A converters, digital inputs or outputs, standard industry interfaces, etc. The individual members of an application family then differ for example in manufacturer- and type-specific details. The application control programs of the members of an application family often have a high congruent portion of software. This common portion may be realized for example as a ROM memory, so that a considerable cost advantage is achieved particularly in the case of high numbers of items.

A RAM memory (in particular a Flash memory) of the memory unit of the transceiver according to an embodiment of the invention may then contain that portion of an application control program with regard to which the different members of an application family (for example different types of washing machines) differ from one another. This may involve for example configuration data (for example texts of screen menus) or autonomous portions of software.

It should be noted that the ROM portion or the RAM portion of the memory unit of the transceiver is generally a component which is separate from the main memory of the transceiver and serves by itself to carry the code of the application control program. The stored code can be read out from the transceiver without interpretation from the memory unit thereof and be transmitted to a memory device of an external control device. At the receiver end, it is not necessary to be able to distinguish which portions of code originate from a RAM memory or respectively from a ROM memory.

To summarize, it may be stated that an application control program can be divided into a ROM portion and into a RAM portion, it being possible for the ROM portion to be utilized for different applications and to be produced particularly cost-effectively. The RAM portion contains for example specific configurations or specific code constituents. This memory division results in a further saving of costs.

The control unit of the transceiver may be a microprocessor, in particular an 8-bit or 16-bit microprocessor. A comparatively restricted performance (relative to the performance of the processor of the external control device) suffices for the microprocessor of the transceiver since the microprocessor does not have to be capable of autonomously processing the application control program for the control of the associated application. This functionality is performed by the more powerful processor of the external control device. Equipping the transceiver with a comparatively simple microprocessor brings about a further cost advantage.

Furthermore, the transceiver according to an embodiment of the invention may have an initialization unit set up in such a way that a communication link to an external control device can be established by means of the initialization unit. In particular, the initialization unit may be set up in such a way that it can communicate a signal to an external control device for the purpose of establishing a communication link to said external control device. Supplementarily or optionally, the initialization unit may be set up in such a way that it can receive a signal from an external control device for the purpose of establishing a communication link to an external control device.

The transceiver according to an embodiment of the invention is particularly well suited to the control of such application devices which are battery-operated, i.e. are not coupled to a socket or the power supply network. The power supply of the application device may also be realized for example by means of a solar cell or by means of a thermogenerator. From this standpoint it is desirable for the application device associated with a transceiver to be realized in particularly energy-saving fashion. In a scenario in which the transceiver receives external signals from the external control device for establishing a communication link and itself emits only few signals of this type, a transceiver with a low energy requirement is produced. By way of example, if an external control device is provided for controlling the domestic appliances of a residential building, then the external control device may emit communication signals in a predetermined temporal sequence (e.g. every second, minute or hour), which signals may be received by a transceiver of an assigned application device, for example when a user with an external control device enters a room. After corresponding communication signals from the external control device have been received by the transceiver, the transceiver may send a confirmation signal back to the external control device.

By way of example, one of the following communication protocols may be used as communication protocol for communicating between the initialization unit and an external control device: Common Object Request Broker Architecture (CORBA), Simple Service Discovery Protocol (SSDP), JXTA or Java Intelligent Network Infrastructure (JINI). In particular, a standard protocol is preferably used for the communication of the initialization unit ("discovery protocol"). Since generally only a single service is to be offered, namely the service of communication of the application control program, it is also possible to use a simple version of one of said protocols ("light version") or a proprietary protocol.

The application control program may be present for example as Java code.

The transceiver is preferably configured as an "embedded system". A process computer system fashioned considerably smaller than a server is known as an embedded system and has the following properties, in particular: an embedded system is generally a constituent part of another apparatus (often incorporated into the latter), the function of which is essentially defined by the embedded system. In particular, an embedded system may be a measured value preprocessing system integrated into another apparatus. Compared with larger process computer systems, a device for human-machine communication is not fashioned or is fashioned only to a slight extent in the case of an embedded system. Often there is a keyboard or a display which can be used to operate the application apparatus but not the embedded system. A counterpart to an embedded system would be a computer server, for example.

The controllable application arrangement according to an embodiment of the invention, having the transceiver according to an embodiment of the invention, is described in more detail below. Refinements of the transceiver also apply to the controllable application arrangement.

The application device may be for example a sensor device, an electronic control device, automotive electronics or a domestic appliance. An application device formed as a sensor device may be for example a temperature sensor, a filling level sensor, a moisture sensor, a gas sensor or a pressure sensor. A device formed as a domestic appliance may be for example a refrigerator, a stereo system, a heating system or a cooker.

The control system according to an embodiment of the invention for an application device, said control system having a transceiver according to an embodiment of the invention, is described in more detail below. Refinements of the transceiver also apply to the control system for an application device.

The external control device may be a personal computer, a laptop, a sufficiently powerful mobile radio telephone, a Palm™ or a personal digital assistant.

The external control device of the control system according to an embodiment of the invention may have a memory device for storing at least one application control program and also a processor set up in such a way that it can execute an application control program in order thereby to control an application device coupled to the transceiver.

The external control device may have a storage duration management device set up in a such a way that it prescribes, for each application control program stored in the memory device, a time value specifying the time after which an application control program stored in the memory device is erased from the memory device. The time value may be prescribed by the storage duration management device on the basis of at least one of the following criteria: How often has the application control program been executed in the past? When was the application control program executed last? What is the memory requirement of the application control program? To what type of application does the application control program relate?

By way of example, the storage duration management device may prescribe a comparatively short time value for an application control program which has been executed very infrequently in the past and which has a high memory requirement. After a time that corresponds to the predetermined time value has elapsed, this application control program can be erased from the memory device.

In other words, the memory device of the external control device is managed by the storage duration management device. If an application control program needs a high memory requirement, for example, and if this application control program, communicated at a point in time in the past from a transceiver of the external control device, has been used only infrequently or only at long time intervals, then the application control program is erased after the associated time value has elapsed. Further criteria on the basis of which the storage duration management device prescribes a time value of an application control program are conceivable.

The external control device may furthermore contain an interrogation unit set up in such a way that it can be used to determine whether an application control program stored in the memory unit is already contained in the memory device. If the interrogation unit determines that an application control program stored in the memory unit is already contained in the memory device, the application control program of the external control device is not communicated. Otherwise, the application control program of the external control device is communicated.

In accordance with the transceiver in accordance with another embodiment of the invention, instead of the application control program, an identification specification that unambiguously identifies the application control program is stored in the memory unit. Said identification specification may be an Internet address from which the external control device can download the application control program from the Internet. In other words, it is also possible for an application control program to be downloaded from an HTML page from the Internet. In this scenario, it is merely necessary for the transceiver of the external control device to communicate that address of an HTML page from which the application control program can be downloaded. The application control program can then be downloaded from the Internet by the external control device, so that it is not necessary to communicate the entire code from the transceiver to the external control device.

The external control device may be controlled by means of a browser.

Furthermore, an embodiment of the invention provides a method for operating a transceiver. In accordance with a preferred refinement of the method according to an embodiment of the invention, a communication link to the external control device is established by means of an initialization unit. Furthermore, an interrogation unit may be used to determine whether or not an application control program stored in the memory unit is already contained in the memory device.

BRIEF DESCRIPTION OF THE DRAWINGS

Exemplary embodiments of the invention are illustrated in the figures and are explained in more detail below.

DETAILED DESCRIPTION OF PREFERRED EMBODIMENTS OF THE INVENTION

Figure 1:
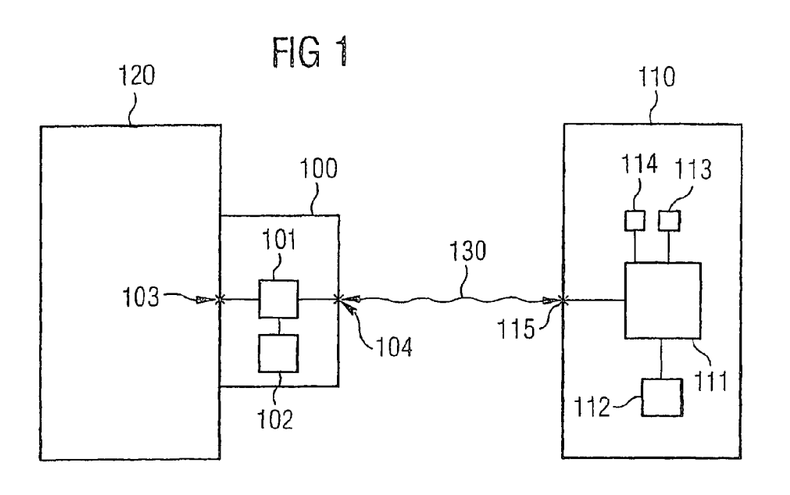
FIG. 1 shows a schematic view of a controllable application arrangement together with an external control device in accordance with an exemplary embodiment of the invention.

FIG. 1 shows a controllable application arrangement comprising a transceiver 100 and a washing machine 120 in accordance with an exemplary embodiment of the invention.

The transceiver 100 has an 8-bit microprocessor 101 as a control unit. Furthermore, the transceiver 100 has a memory unit 102 having a storage capacity of 128 kB, which memory unit 102 is coupled to the 8-bit microprocessor 101. Furthermore, the transceiver 100 has a communication interface 104 coupled to the 8-bit microprocessor 101. An application control program for controlling the washing machine 120 is stored in the memory unit 102. The washing machine 120 as the application device is controllable by means of a laptop 110 as an external control device via the control interface 103 and via the communication interface 104 using the 8-bit microprocessor 101. It is possible for the application control program for controlling the washing machine 120 to be communicated to the laptop 110 via the communication interface 104. The arrow 130 indicates that the communication interface 104 is set up in such a way that the communication between the transceiver 100 and the laptop 110 is effected by means of reciprocal communication of infrared radiation, that is to say via a radio link. The application control program stored in the memory unit 102 of the transceiver 100 is present as Java code. The transceiver 100 is configured as an embedded system and is incorporated into the washing machine 120.

The laptop 110 has a central data processing unit CPU 111 that is substantially more powerful than the 8-bit microprocessor 101. In particular, the performance of the CPU 111 suffices to execute the application control program for controlling the washing machine 120. Furthermore, the laptop 110 has a hard disk store 112 having a capacity of 5 GB as a memory device. The CPU 111 is set up in such a way that it can execute an application control program in order to control the washing machine 120 coupled to the transceiver 100. Furthermore, the laptop 110 has a storage duration management device 113 set up in such a way that it prescribes, for each application control program stored in the hard disk store 112, a time value which specifies the time after which the respective application control program is erased from the hard disk store 112.

The functioning of the system shown in FIG. 1 is described below.

If a user with the laptop 110 enters the room in which the washing machine 120 is installed, then a communication link is established between the transceiver 100 and the laptop 110 by virtue of an initialization unit of the transceiver receiving a signal from the laptop 110 (not shown in the figure).

An interrogation unit 114 of the laptop 110 is set up in such a way that it can be used to determine whether the hard disk store 112 already contains the application control program for controlling the washing machine 120 that is stored in the memory unit 102 of the transceiver 100. In accordance with the present scenario in the exemplary embodiment described, such an application control program is not stored in the hard disk store 112.

Therefore, the interrogation unit 114 determines that the application control program for controlling the washing machine 120 is not stored in the hard disk store 112. Since the application control program for controlling the washing machine 120, which application control program is required for controlling the washing machine 120, is not stored in the hard disk store 112 of the laptop 110, the application control program for controlling the washing machine 120 that is stored in the memory unit 102 of the transceiver 100 is communicated via the communication interface 104 to the laptop 110 via a laptop interface 115 and is stored in the hard disk store 112.

By means of the storage duration management device 113, the application control program stored in the hard disk store 112 is assigned, based on the memory requirement of the application control program and based on the type of application ("washing machine"), a time value after which the application control program is erased from the hard disk store 112. In accordance with the exemplary embodiment described, the time value "six months" is assigned to the application control program for the control of the washing machine 120.

After the storage of the application control program for controlling the washing machine 120 in the hard disk store 112 of the laptop 110, the application control program for controlling the washing machine 120 can be processed by means of the CPU 111 of the laptop 110. In this way, the washing machine 120 is controlled via the laptop interface 115, the communication interface 104 and via the control interface 103 using the 8-bit microprocessor 101.

After the predetermined time value ("six months") has elapsed, the application control program for controlling the washing machine 120 is erased from the hard disk store 112 provided that the application control program has not been used on at least one further occasion within this time period. Upon every process of using the application control program for controlling the washing machine 120, the time value starts to run from the beginning in accordance with the exemplary embodiment described.

Figure 2:
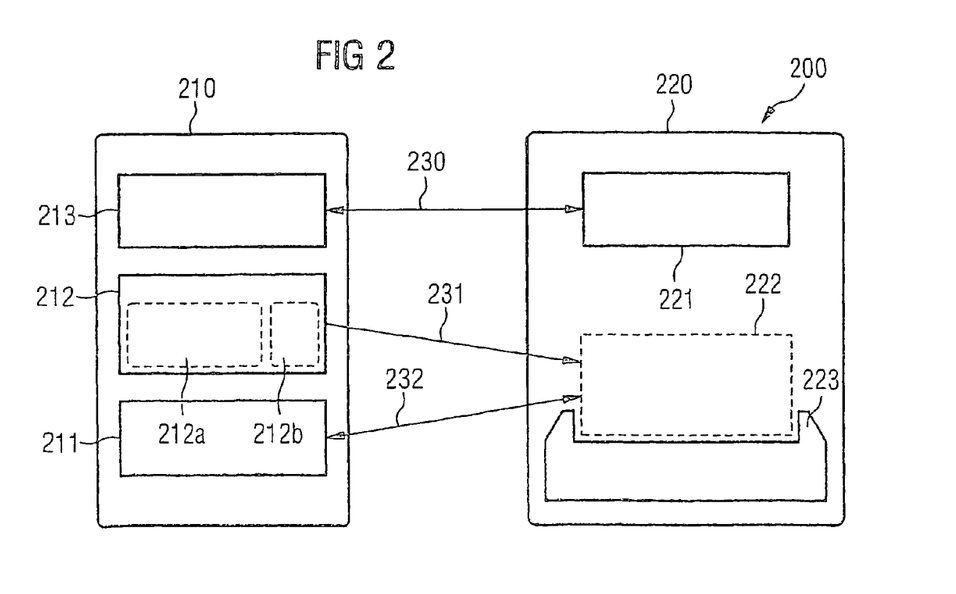
FIG. 2 shows a control system in accordance with an exemplary embodiment of the invention.

A description is given below, with reference to FIG. 2, of a control system 200 for controlling an application device (not shown in the figure). The control system 200 has a transceiver 210 and a personal computer 220 set up in such a way that it can communicate with the transceiver 210.

The transceiver 210 has a control unit 211 (a 16-bit microprocessor). Furthermore, the transceiver 210 has a memory unit 212 and an initialization device 213. The memory unit 212 is divided into a ROM submemory 212*a* and a Flash submemory (RAM memory) 212*b*. An application control program for controlling an application control device is stored in the memory unit 212. Data that are common to an application family are stored in the ROM submemory 212*a*, whereas specific data of a member of an application family are stored in the Flash submemory 212*b*.

In accordance with the exemplary embodiment described, the application family represents different types of washing machine from a specific manufacturer. Those data or that code which are/is necessary for controlling all the washing machines from the manufacturer are stored in the ROM submemory 212*a*. By contrast, that control code of the application control program for controlling the washing machine of type XY which deviate from the control code for controlling other types of washing machine (type XZ, YZ, etc.) from the manufacturer is stored in the Flash submemory 212*b*.

Furthermore, a personal computer 220 is shown, having a communication module 221, a hard disk store 222 and a Middleware platform 223 (Java virtual machine). In accordance with this exemplary embodiment, Middleware is to be understood as an interpreter software that is used to realize an interaction of hardware and software components, independently of the actual hardware, i.e. independently of the platform.

The communication between the transceiver 210 and the personal computer 220 is described below.

Firstly, the communication between the transceiver 210 and the personal computer 220 is initialized, i.e. a communication link is established. Java intelligent network infrastructure (JINI) is used as a communication protocol for the communication of the initialization unit 213 with the communication module 221 of the personal computer 220. The phase in which the transceiver 210 and the personal computer 220 establish contact with one another may be referred to as the "discovery phase". The initial communication is identified by the arrow 230.

If the application control software of the memory unit 212 is not contained in the hard disk store 222, the control software is communicated to the personal computer 220 and stored in the hard disk store 222. The decision regarding whether the application control program is to be communicated is taken on the basis of an identification number that is communicated from the transceiver 210 to the personal computer 220. On the basis of the identification number, a check is made to determine whether or not the application control program assigned to the identification number is already contained on the hard disk 222. The application control program is communicated from the memory unit 212 of the transceiver 210 to the hard disk store 222 of the personal computer 220 as required on the basis of the result of the check. This is identified by an arrow 230.

After carrying out the download step, an application device (not shown in FIG. 2) is controlled via the control unit 211 by means of the Middleware platform 223 or the application control program stored in the hard disk store 222. This application-specific communication is identified by the arrow 232.

A transceiver 300 in accordance with an exemplary embodiment of the invention is described below with reference to FIG. 3.

The transceiver 300 has a control unit 301 realized as an 8-bit microprocessor, an input/output unit 302, a first submemory 303 formed as a Flash memory, a second submemory 304 formed as a ROM memory, an RF transceiver unit 305 (RF=radio frequency) and an embedded microcontroller 306. Furthermore, FIG. 3 schematically shows a physical communication layer unit 307 having a first subarea 307*a*, which is part of the RF transceiver unit 305, and a second subarea 307b, which is allocated to the microcontroller 306. Furthermore, the configuration data 308 are part of the microcontroller 306. Moreover, FIG. 3 schematically shows an application control program 309, which may likewise be allocated to the microcontroller 306. Furthermore, the transceiver 300 contains an initialization protocol 310, which is likewise part of the microcontroller 306. A communication protocol 311 is furthermore provided in the transceiver 300 and is likewise part of the microcontroller 306. Furthermore, a TCP/IP protocol 312 is provided as a further part of the microcontroller 306 (TCP/IP: Transmission Control Protocol/Internet Protocol).

Figure 3:
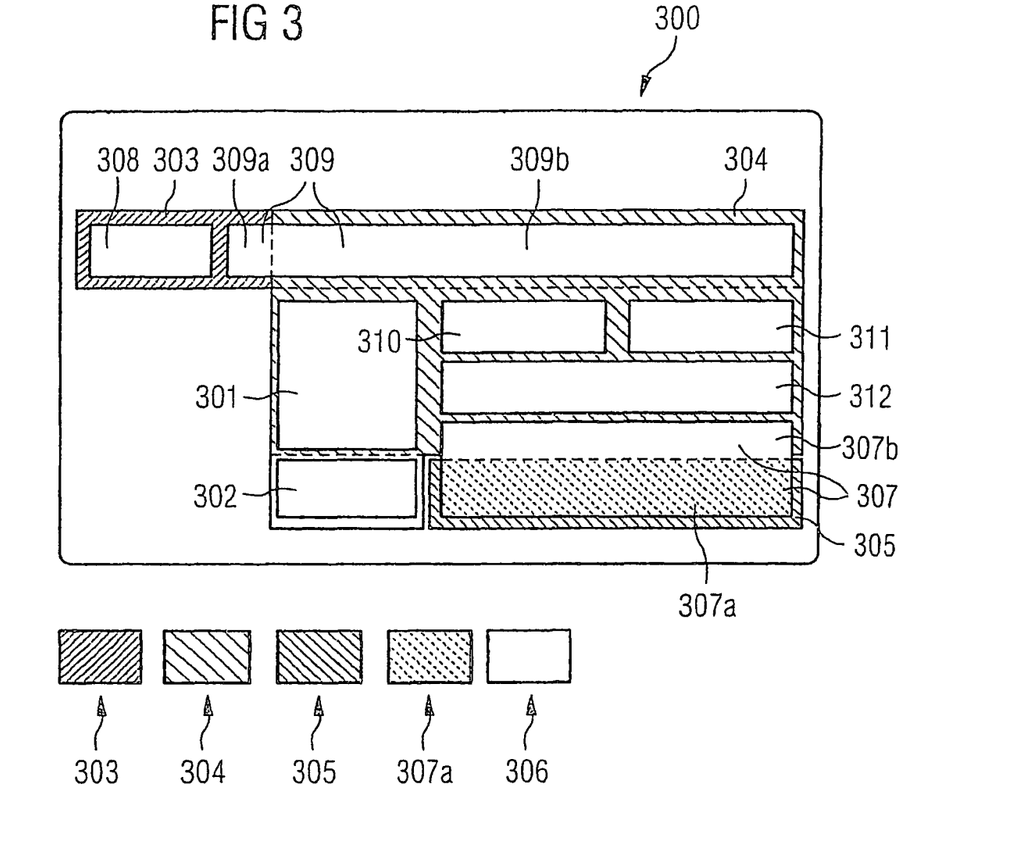
FIG. 3 shows a transceiver in accordance with an exemplary embodiment of the invention.

As shown schematically in FIG. 3, the configuration data 308 are stored in the Flash memory 303. A first subarea 309a of the application control program 309 is likewise stored in the Flash memory 303. Said subarea 309a contains data that are specifically coordinated with an application device to be controlled. In other words, these data are not common data of the application family to which the application device to be controlled belongs. Rather, these data are such data which are specifically provided for the application device as a member of an application family, and which differ from the control data of other members of the application family. By contrast, the second subarea 309b of the application control program 309 is stored in the ROM memory 304 and contains such data which are necessary for the application family with which the application device is associated as a member. The TCP/IP protocol stack 312 is likewise realized as a computer program stored in the ROM memory 304. The initialization protocol 310 contains data required for establishing a communication link to an external control device. The communication protocol 311 contains data that are required if configuration data 308 or the application control program 309 are/is to be communicated from the transceiver 300 to an external control device. The application control program 309 or the configuration data 308 is/are processed by a CPU of an external control device. An application device (for example a washing machine) connected to the transceiver unit 300 is controlled via the control unit 301. The control is effected via the input/output unit 302. The latter produces an interface between the control unit 301 and the application device to be controlled. The data transfer from the transceiver 300 to the application device is effected via the input/output unit 302.

In accordance with a preferred exemplary embodiment, the Middleware platform (cf. element 223 in FIG. 2) of the external control device is a Java Virtual Machine™. In accordance with this exemplary case, the application code to be communicated from the transceiver of the external control device is a Java Applet™ (code execution within an Internet browser) or a Java Application™ (code execution by a starter application of the external control device) or a Java Plugin (code execution within a running application). A Java application is an autonomous Java program that can be executed by means of a Java interpreter. A Java applet is a Java program that can be loaded into a running WWW browser. A Java plugin is a Java program that can be executed within a running application and makes use of the resources of the application or provides services for the application. The application control program may be composed of Java class files and resource files (for example image files, audio files, etc.) that are combined into one or a plurality of Jar archive files in an industry standard manner. In this case, it is possible not only for a bundling to be effected, rather classes and resources are stored in compressed fashion in Jar archives. In this way, not only the communication of the code is minimized, but also the memory outlay on the part of the transceiver.

Figure 4:
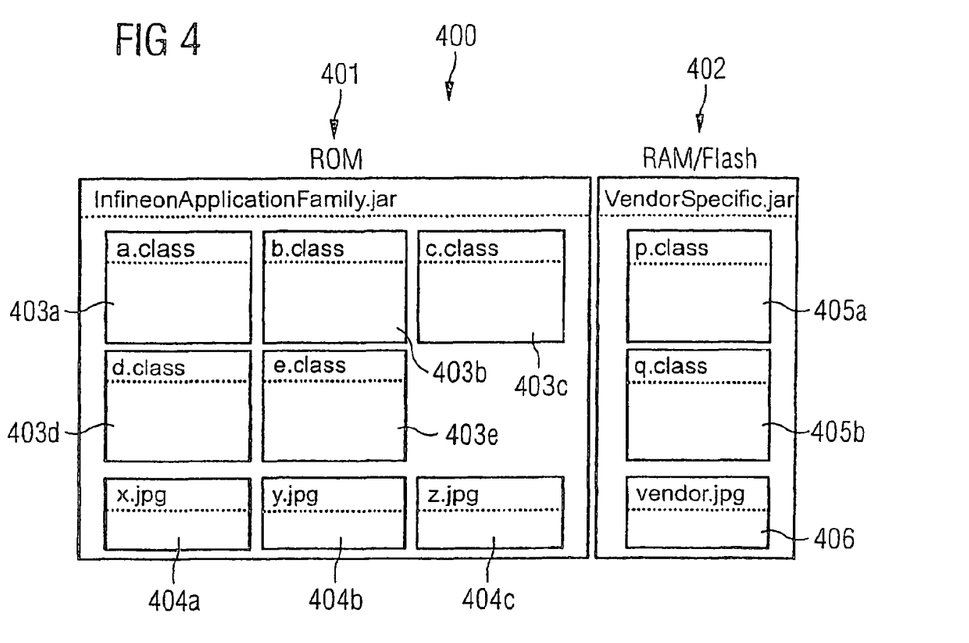
FIG. 4 shows a memory unit of a transceiver in accordance with an exemplary embodiment of the invention.

A description is given below, with reference to FIG. 4, of the division of information items to be stored in a memory unit 400 of a transceiver.

The memory unit 400 is divided into a ROM submemory 401 and into a RAM/Flash memory 402. An application control program for controlling an application device is subdivided into two Jar archives, namely into the "InfineonApplicationFamily.jar" archive and into the "VendorSpecific.jar" archive.

The "InfineonApplicationFamily.jar" archive combines first to fifth superclasses 403a to 403e and first to third resource files 404a to 404c for an application family. In the exemplary case described, the resource files 404a to 404c are in each case graphics files in the jpg format.

The "VendorSpecific.jar" archive holds a first subclass 405a and a second subclass 405b and also a resource file 406, once again a jpg graphics file.

The use of classes in the RAM/Flash memory 402 is not absolutely necessary. The resource file 406 contains manufacturer-specific resources, for example a company logo, or text files, for example for a specific menu setup.

The invention claimed is:

1. A control system for an application device comprising a transceiver, wherein the transceiver is arranged to control the application device by means of an external control device, and the transceiver comprises:
   a control unit;
   a memory unit coupled to the control unit and having an application control program stored therein, wherein the application control program comprises code that enables a platform-independent integration into the system of the external control device;
   a control interface coupled to the control unit, and a communication interface coupled to the control unit, wherein the application control program is communicated to the external control device via the communication interface, wherein the transceiver stores but does not execute the application control program,
   wherein the application device is controllable using the external control device via the control interface and via the communication interface using the control unit,
   wherein the communication between the application control program in the external control device and the control unit in the transceiver is effected in application-specific fashion, and
   wherein the external control device communicates with the transceiver, has a memory device configured to store at least one application control program, and has a processor configured to execute the at least one application control program to thereby control the application device coupled to the transceiver, and
   an interrogation unit located in the external control device and being configured to determine whether the at least one application control program stored in the memory unit is already contained in the memory device,
   wherein if the interrogation unit determines that the at least one application control program stored in the memory unit is already contained in the memory device, the at least one application control program of the external control device is not communicated.

2. The control system as claimed in claim 1, wherein the external control device is a workstation, a personal computer, a laptop, a webpad, a mobile radio telephone, a Palm™, or a personal digital assistant.

3. The control system as claimed in claim 1, wherein the external control device comprises a storage duration management device that prescribes, for the at least one application control program stored in the memory device, a time value specifying the time after which the at least one application control program is erased from the memory device.

4. The control system as claimed in claim 3, wherein the time value is prescribed by the storage duration management device based on at least one of the following criteria: how often the application control program has been executed in the past; when the application control program was executed last; a memory requirement of the respective application control program; and what type of application the application control program relates to.

* * * * *